(12) United States Patent
Sumter et al.

(10) Patent No.: US 7,086,676 B2
(45) Date of Patent: Aug. 8, 2006

(54) MULTI-PURPOSE TONGS HAVING AN INCREMENTAL CAM

(75) Inventors: John E. Sumter, Sanford, FL (US); Hector Javier Barea Lugo, Orlando, FL (US); Christopher J. Claypool, Orlando, FL (US)

(73) Assignee: Dart Industries Inc,, Orlando, FL (US)

( * ) Notice: Subject to any disclaimer, the term of this patent is extended or adjusted under 35 U.S.C. 154(b) by 0 days.

(21) Appl. No.: 10/447,577

(22) Filed: May 29, 2003

(65) Prior Publication Data
US 2004/0239129 A1     Dec. 2, 2004

(51) Int. Cl.
A47G 21/10    (2006.01)
A47J 42/28    (2006.01)

(52) U.S. Cl. .................... 294/16; 294/99.2
(58) Field of Classification Search .......... 294/3, 294/5, 7, 8, 8.5, 11, 16, 28–31.1, 33, 99.2, 294/100, 106, 110.1, 115–117
See application file for complete search history.

(56) References Cited

U.S. PATENT DOCUMENTS

| | | | |
|---|---|---|---|
| 2,249,551 A | | 7/1941 | Zohe |
| 2,304,966 A | | 12/1942 | Thrower |
| D141,909 S | | 7/1945 | Tamblyn |
| 2,745,695 A | * | 5/1956 | Peyer ..................... 294/118 |
| 2,800,356 A | * | 7/1957 | Benton ..................... 294/106 |
| 2,864,645 A | * | 12/1958 | Meldrum ..................... 294/106 |
| 3,211,488 A | * | 10/1965 | Duranel ..................... 294/99.2 |
| 3,356,405 A | | 12/1967 | Gruber |
| 3,596,965 A | | 8/1971 | Woofter |
| 3,640,561 A | | 2/1972 | Law |
| 4,223,936 A | | 9/1980 | Jorgensen |
| 4,535,538 A | | 8/1985 | Nelson |
| 4,606,569 A | | 8/1986 | Dunn et al. |
| 4,823,419 A | | 4/1989 | Stimpson |
| 4,835,864 A | | 6/1989 | Tang |
| 4,955,971 A | | 9/1990 | Goulter |
| 4,984,367 A | | 1/1991 | Albanese |
| 5,054,835 A | | 10/1991 | Loechel et al. |
| 5,199,756 A | | 4/1993 | Bartlett |
| 5,403,052 A | | 4/1995 | Lampron |
| 5,542,181 A | | 8/1996 | Gaylord |
| D376,514 S | | 12/1996 | Torkelson |
| 5,934,721 A | | 8/1999 | Walde ......................... 294/3 |
| 6,012,752 A | * | 1/2000 | Douglas ................... 294/110.1 |
| 6,056,338 A | | 5/2000 | Kerr ........................... 294/16 |
| 6,089,631 A | | 7/2000 | Thurlow et al. .............. 294/16 |
| 6,092,847 A | | 7/2000 | Kwan ......................... 294/16 |

(Continued)

Primary Examiner—Eileen D. Lillis
Assistant Examiner—Paul T. Chin
(74) Attorney, Agent, or Firm—John A. Doninger (57) ABSTRACT

A multi-purpose tongs having a first tong member that includes a grasping end and a hinge end, and a second tong member that includes a grasping end and a hinge end. The first and the second tong members are pivotally connected to one another by a first pin at their hinge ends. A cam is slidably disposed between the first and the second tong member hinge ends. The cam includes a first transverse slot and a second transverse slot having a plurality of incremental and adjacent support surfaces. The first pin extends through the first transverse slot and limits the slidable movement of the cam. A second pin is attached to the second tong member hinge end and extends through the second transverse slot and is adapted to rest against the plurality of incremental support surfaces.

12 Claims, 6 Drawing Sheets

U.S. PATENT DOCUMENTS

| | | | |
|---|---|---|---|
| 6,217,092 B1 | 4/2001 | Spicker | 294/16 |
| 6,276,734 B1 | 8/2001 | Krieger | 294/99.2 |
| 6,568,728 B1 * | 5/2003 | Wang | 294/16 |
| 6,568,731 B1 * | 5/2003 | Alexander et al. | 294/110.1 |
| D477,189 S * | 7/2003 | Bull et al. | D7/686 |
| D488,032 S * | 4/2004 | Best et al. | D7/686 |
| 6,726,263 B1 * | 4/2004 | Wang et al. | 294/16 |
| D491,028 S * | 6/2004 | Claypool et al. | D7/686 |
| 6,821,074 B1 * | 11/2004 | Schreiber et al. | 294/106 |

\* cited by examiner

MULTI-PURPOSE TONGS HAVING AN INCREMENTAL CAM

TECHNICAL FIELD

The present invention is directed toward tongs for handling food items, and more particularly, toward multi-purpose tongs having a slidable cam assembly which controls the degree of which the tong members can open and close relative to one another.

BACKGROUND OF THE INVENTION

Prior art spring-loaded tongs are commonly used to handle food and provide a convenient way to grasp objects to be temporarily transported. On problem with the prior art spring loaded tongs is that the tongs take up significant amount of space if left in the open condition. This is typically not a problem when the tongs are used, but becomes undesirable when the tongs are to be stored. If the tongs are compressed and closed and placed in a drawer, the spring action of the tongs may cause the tongs to open rendering the drawer difficult to open.

Another disadvantage of the prior art tongs is that they are only capable of become fully opened or closed and cannot be used in intermediate opened and closed positions. This is significantly of a disadvantage for a user with small hands to use the tongs in a fully opened position. Moreover, in order to handle food items of varying size and dimension, the prior art tongs are also more difficult to operate and do not allow for varying degrees of which the tong members can be incrementally positioned relative to one another.

It is therefore a primary object of the present invention to provide a mechanism that allows the tongs to be used in varying intermediate positions between a fully closed position and a fully opened position.

It is another object of the present invention to provide multi-purpose tongs that can be used by people with small hands.

It is a further object of the present invention to provide multi-purpose tongs that are spring-biased and are storable in a locked position.

SUMMARY OF THE INVENTION

These problems and others are addressed by the present invention which comprises multi-purpose tongs having a first tong member that includes a grasping end and a hinge end, and a second tong member that includes a grasping end and a hinge end. The first and the second tong members are pivotally connected to one another by a first pin at their hinge ends. A cam is slidably disposed between the first and the second tong members at their hinge ends. The cam includes a first transverse slot and a second transverse slot having a plurality of incremental and adjacent support surfaces. The first pin extends through the first transverse slot and limits the slidable movement of the cam. A second pin is attached to the second tong member hinge end and extends through the second transverse slot and is adapted to rest against the plurality of incremental support surfaces.

BRIEF DESCRIPTION OF DRAWINGS

These and other objects of the present invention will be appreciated and understood by those skilled in the art from the detailed description of the preferred embodiments of the invention and the following drawings of which.

DETAILED DESCRIPTION OF THE INVENTION

Figure 1:
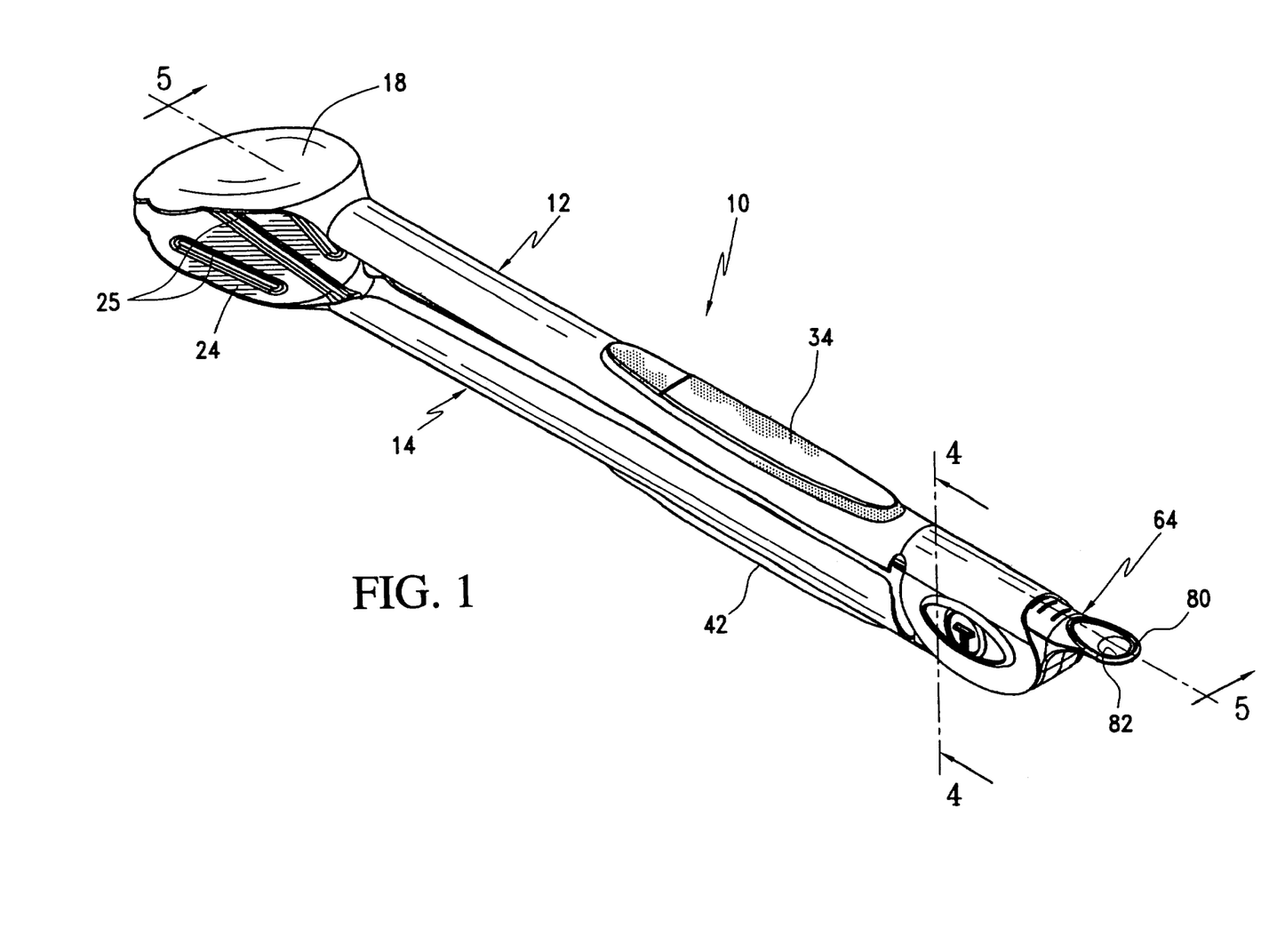
FIG. 1 is a perspective view of the multi-purpose tongs having a cam mechanism according the present invention.
Figure 2:
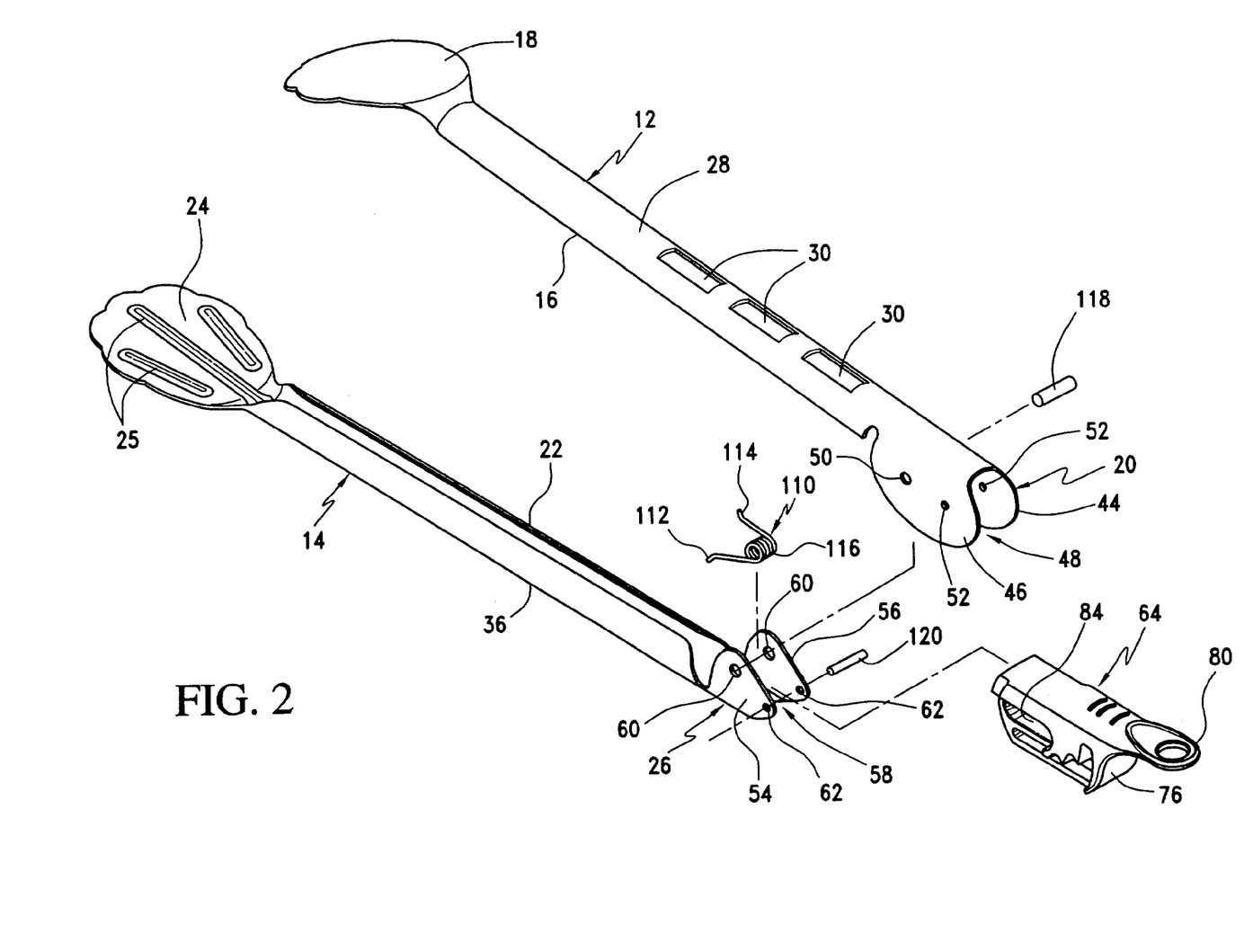
FIG. 2 is an exploded view of the multi-purpose tongs having a cam mechanism according to FIG. 1.

Referring now to the drawings, wherein the showings are for the purpose of illustrating the preferred embodiment of the invention only and not for the purpose of limiting the same, multi-purpose tongs 10 are shown that include an upper tong member 12 and a lower tong member 14. The upper tong member 12 includes an elongated channel-type portion 16 having a grasping end 18 and a hinge end 20 opposing the grasping end 18 and, similarly, the lower tong member 14 includes an elongated channel type portion 22 having a grasping end 24 and a hinge end 26 opposing the grasping end 24. The lower tong member grasping end 24 may include a plurality of longitudinally extending protrusions 25 on its upper surface. The upper and the lower tong members 12, 14, may be manufactured from, but not limited to, steel, aluminum, plastic, or any combinations thereof.

The upper tong member 12 further includes an upper web 28 having a plurality of protrusion-receiving apertures 30 thereon which, as will be explained in greater detail, are dimensioned and configured to receive corresponding protrusions 32 of an upper heat pad 34 for securing the upper heat pad 34 on the upper tong member 12. Similarly, the lower tong member 14 further includes a lower web 36 having a plurality of protrusion-receiving apertures 38 thereon which are dimensioned and configured to receive corresponding protrusions 40 of a lower heat pad 42 for securing the lower head pad 42 on the lower tong member 14.

Moreover, the upper tong member hinge end 20 includes a first flange 44 and a second flange 46 extending downwardly from the web 29, wherein the first and the second flanges 44, 46, define a space 48 therebetween. Upper tong member first and second flanges 44, 46 also include first pin-receiving apertures 50 aligned with one another and second pin-receiving apertures 52 aligned with one another.

Similarly, the lower tong member hinge end 26 includes a first flange 54 and a second flange 56 extending upwardly from the web 36 wherein the first and the second flanges 54, 56 define a space 58 therebetween. The lower tong member first and second flanges 54, 56 also include first pin-receiving apertures 60 aligned with one another and second pin-receiving apertures 62 aligned with one another.

Figure 3:
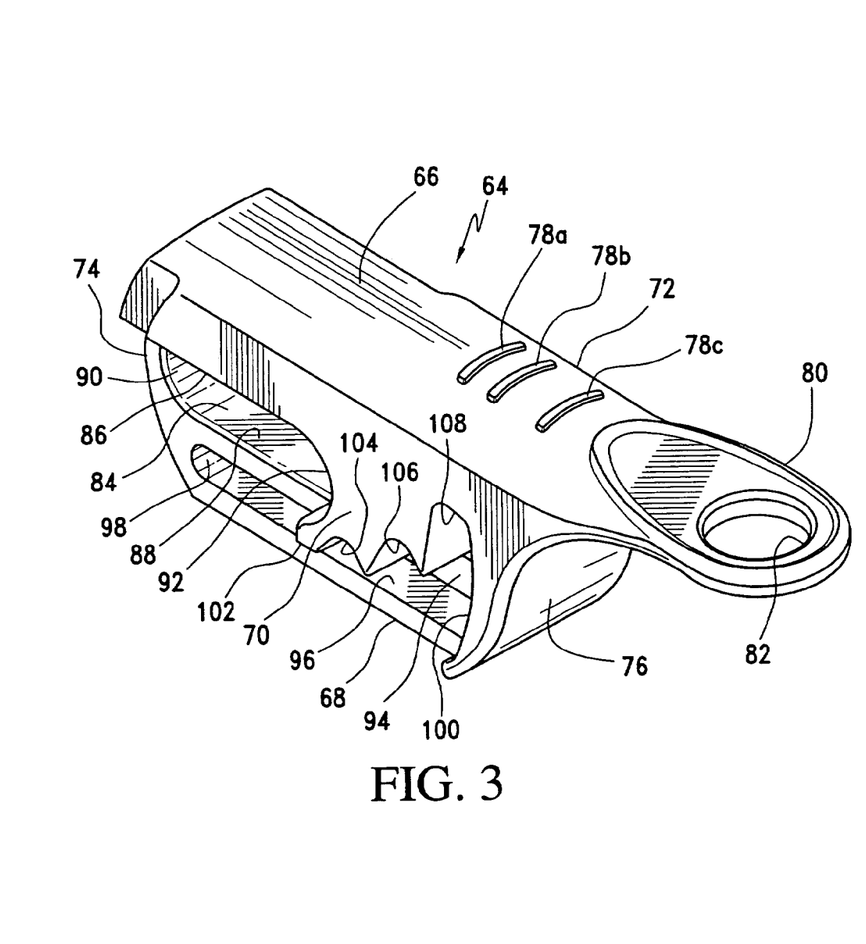
FIG. 3 is an enlarged perspective view of the cam mechanism for the multi-purpose tongs.
Figure 4:
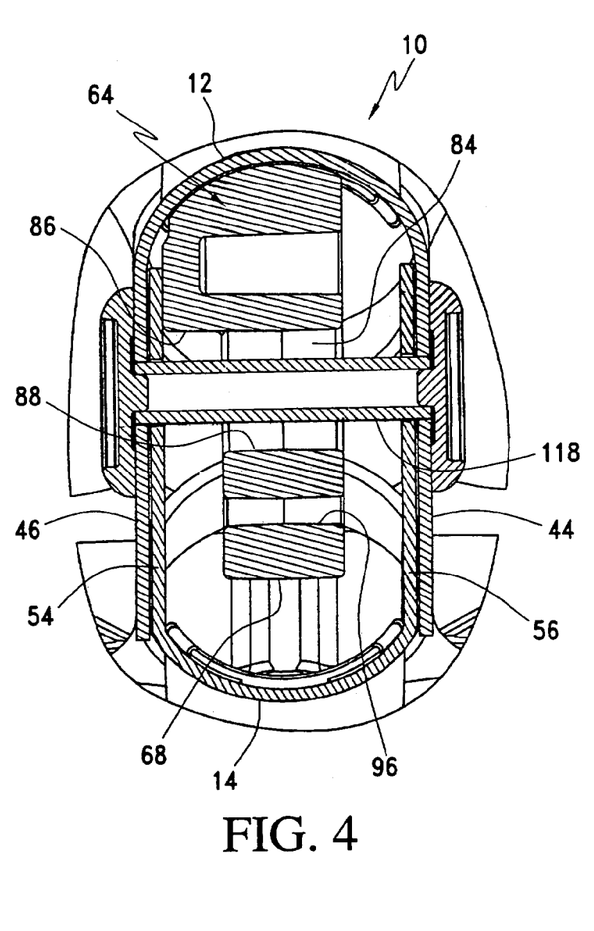
FIG. 4 is a rear sectional view of the multi-purpose tongs taken along line 4—4 of FIG. 1.
Figure 5:
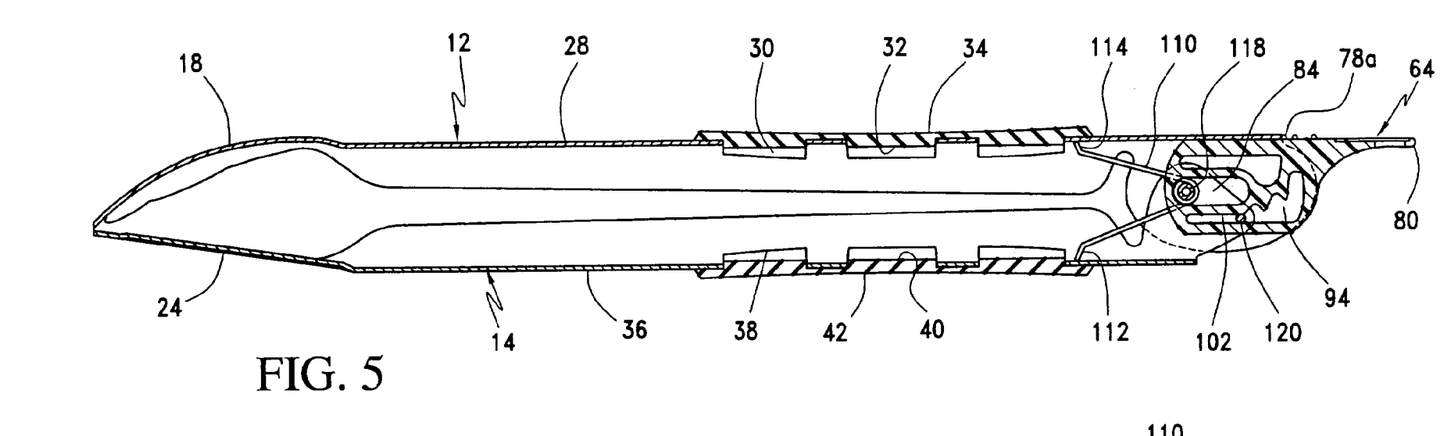
FIG. 5 is a side sectional view of the multi-purpose tongs in a locked and closed position and taken along line 5—5 of FIG. 1.

Referring now to FIGS. 3 and 5, a slidably operable stepped cam means indicated generally at 64 for the multi-purpose tongs 10 is illustrated. It will be appreciated that the preferred slidable cam means 64 might, for example, be replaced by a rotatable cam means. As will be discussed in greater detail hereinafter, the cam means 64 controls the degree of which the upper and the lower tong members 12, 14, can pivotally open or close to be incrementally positioned relative to one another. The cam means 64 includes a top 66, a bottom 68, a first side 70, a second side 72 opposing the first side 70, a front 74, and a back 76 opposing the front 74. The cam means 64 further includes a plurality of transverse ridges 78a, 78b, and 78c disposed on the top 66 providing for a better finger grip by a user. Furthermore, as will be explained in greater detail hereinbelow, transverse ridges 78a, 78b, and 78c provide for a visual identification as to whether the multi-purpose tongs are in a closed position (FIG. 5), a first intermediate position (FIG. 6), or a second intermediate position (FIG. 7), respectively.

Moreover, the cam means 64 includes an actuating tab 80 that extends rearwardly from, and is integral with, the intersecting corner of the top 66 and the back 76. As will be explained in greater detail, a user can slidably operate the cam means 64 using the actuating tab 80 to slide the cam means 64 forward and backward. The actuating tab 80 includes an opening 82 through which the multi-purpose tongs 10 can be hung from a hook or the like on a support wall or surface.

The cam means 64 further includes a first pin-receiving transverse slot 84 defined between a lower surface 86 of the top 66 and an intermediate wall 88, and laterally between a first end 90 and an opposed second end 92. Moreover, the cam means 64 includes a second pin-receiving transverse slot 94 disposed below the first pin-receiving transverse slot 84 and defined between the intermediate wall 88 and an upper surface 96 of the bottom 68, and laterally between a third end 98 and a fourth end 100.

The second pin-receiving transverse slot 94 further includes a first surface 102, a second arcuate surface 104 positioned incrementally higher than, and adjacent to, the first surface 102, a third arcuate surface 106 positioned incrementally higher than, and adjacent to, the second arcuate surface 104, and a fourth arcuate surface 108 positioned incrementally higher than the third arcuate surface 106. As will be explained in greater detail, the incremental arcuate surfaces correspond to the degree of which the upper and the lower tong members can pivotally open and close relative to one another.

Referring now to FIGS. 1, 2, and 5, the multi-purpose tongs 10 further include a spring 110 having a coiled portion 116, a first end 112, and a second end 114 wherein the first and the second ends 112, 114 extend outwardly and upwardly from opposing ends of the coiled portion 116. The coiled portion 116 of the spring 110 is disposed within the first transverse pin-receiving slot 84 so that the first and second ends 112, 114, of the spring 110 are extending out of the opposing sides of the first transverse pin-receiving slot 84 and forward the front 74 of the cam means 64.

Moreover, the cam means 64 is disposed within the space 58 between the lower tong member first and second flanges 54, 56, so that the first and the second flanges 54, 56, and the first and the second flanges 54, 56 substantially abut the first and the second sides 70, 72 of the cam means respectively.

Furthermore, the upper tong member 12 is disposed on top of the lower tong member 14 so that the inner surfaces of the first and second flanges 44, 46 of the upper tong member hinge end are substantially flush against the outer surfaces of the first and second flanges 54, 56, of the lower tong member hinge end respectively, and further, the upper tong member first pin-receiving apertures 50 are substantially aligned with the first pin-receiving transverse slot 84 and the lower tong member first pin-receiving apertures 60.

A first pin 118 is inserted through the first pin-receiving apertures 50 of the upper tong member hinge end, the first pin-receiving transverse slot 84, the coiled portion 116 of the spring 100, and the first pin-receiving apertures 60 of the lower tong member hinge end, wherein the first and the second ends 112, 114 of the spring are resiliently biased against the inner surface of the lower tong member elongated channel-type portion 22 and the inner surface of the upper tong member elongated channel-type portion 16 respectively.

A second pin 120 is inserted through the second pin-receiving apertures 62 of the lower tong member hinge end and the second pin-receiving transverse slot 94 of the cam means 64. The second pin 120 is dimensioned and configured to be received within the second pin-receiving apertures 62 and it is sized lengthwise so that the ends of the pin are flush with the outer surfaces of the lower tong member first and second flanges, 54, 56. The diameter of the second pin 120 is dimensioned so that is can be securely positioned against the first surface 102, second arcuate surface 104, third arcuate surface 106, and the fourth arcuate surface 108. As stated hereinabove, the position of the second pin 120 against the arcuate surfaces corresponds to the varying degrees of which the upper and lower tong members 12, 14 can be opened and closed relative to one another.

Referring now to FIG. 5, the multi-purpose tongs 10 are illustrated in a closed or stored position. In this configuration, the spring 110 is in a compressed position wherein its first and second ends 112, 114, are resiliently biased against the inner surface of the lower tong member elongated channel-type portion 22 and upper tong member elongated channel-type portion 16. The resilient force of the spring 110 is countered by the second pin 120 being pressed against the first stepped surface 102 and therefore preventing the multi-purpose tongs 10 to become opened while it is stored.

Figure 6:
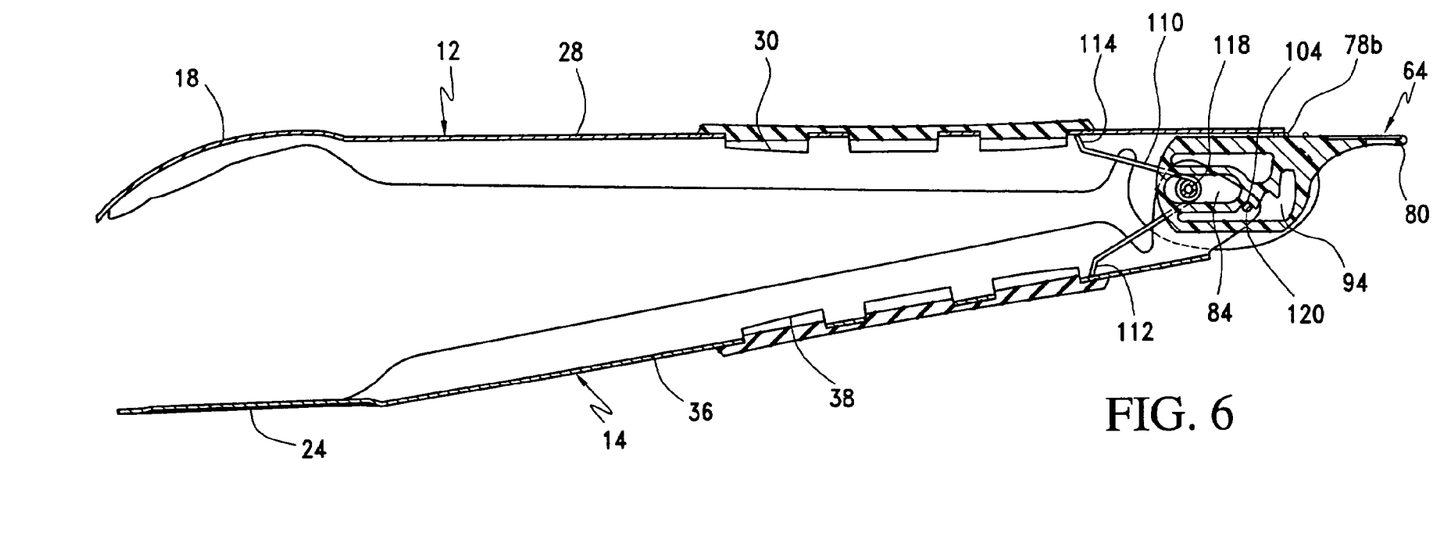
FIG. 6 is a side sectional view of the multi-purpose tongs in a first intermediate opened position.

Referring now to FIG. 6, the multi-purpose tongs 10 are illustrated in a first intermediate opened position. This position and configuration is achieved by pressing the upper and the lower tong members 12, 14 slightly together. This pressing action allows the second pin 120 to be released from being pressed against the first surface 102 thereby allowing the cam means 64 to be freely slid in a forward direction. The cam means 64 is then slightly slid in the forward direction to the extent that the second pin 120 is in a facing relation with the second arcuate surface 104. The upper and the lower tong members 12, 14 are then released to pivotally open about the first pin 118 by the resilient force of the spring 110 to the extent that the second pin 120 will rest against the second arcuate surface 104. As explained hereinbefore, because the second arcuate surface 104 is incrementally higher relative to the first surface 102, the upper and the lower tong members' pivotal movement about the first pin 118 will be limited to the distance which the second pin 120 can travel between the upper surface 96 of the cam bottom 68 and the second arcuate surface 104.

Figure 7:
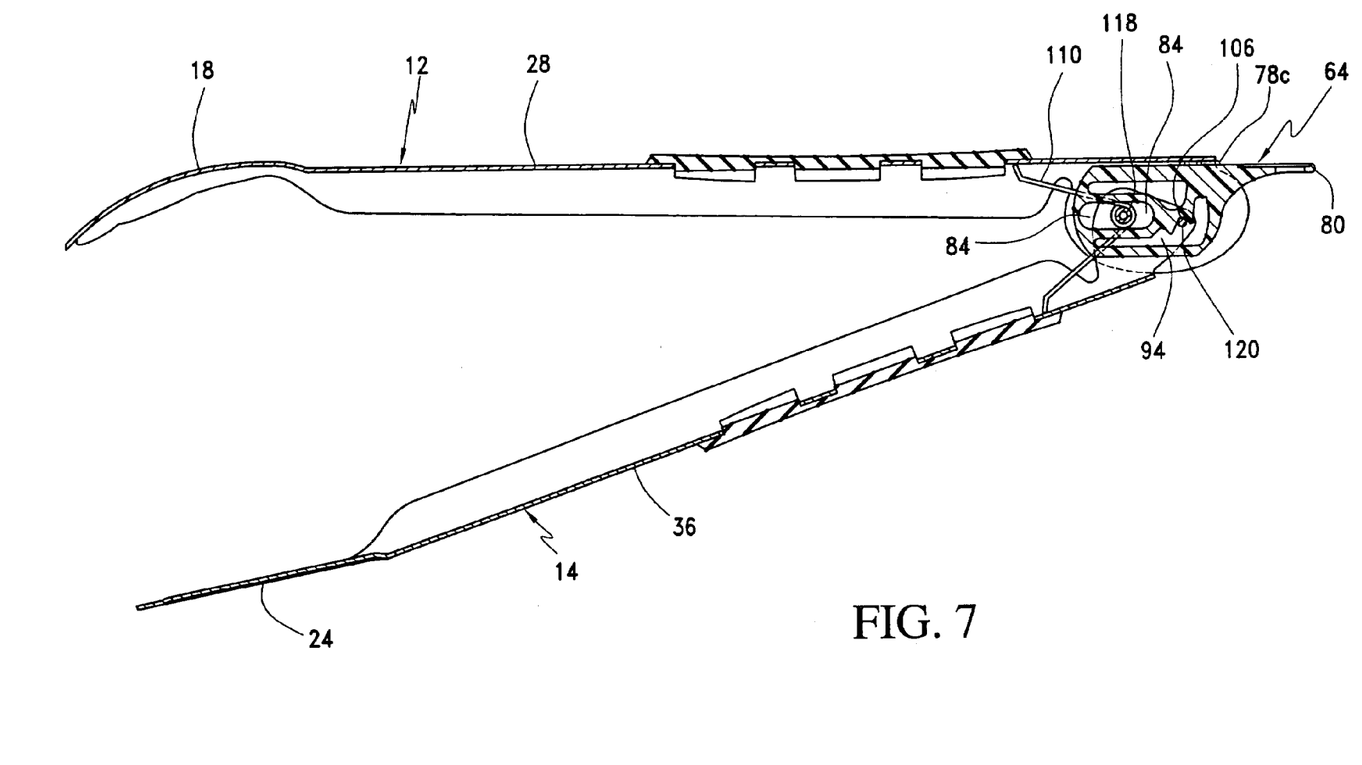
FIG. 7 is a side sectional view of the multi-purpose tongs in a second intermediate opened position; and, FIG. 8 is a side sectional view of the multi-purpose tongs in a fully opened position.

Referring now to FIG. 7, the multi-purpose tongs 10 are illustrated in a second intermediate opened position. In this position and configuration, the upper tong member 12 and the lower tong member 14 are pivotally opened further apart than they were in the first intermediate opened position allowing the user to grab larger food items using the multi-purpose tongs. Similarly, this position is achieved by squeezing the upper and the lower tong members 12, 14, slightly towards one another to either allow the second pin 120 to be released from pressing against the first surface 102 in the closed position or the second pin 120 be released from pressing against the second arcuate surface 104 in the first intermediate opened position. The cam means 64 is then slightly slid in the forward direction to the extent that the second pin 120 is in a facing relation with the third arcuate surface 106. The upper and the lower tong members 12, 14 are then released to pivotally open about the first pin 118 by the resilient force of the spring 110 to the extent that the second pin 120 will rest against the third arcuate surface 106.

Figure 8:
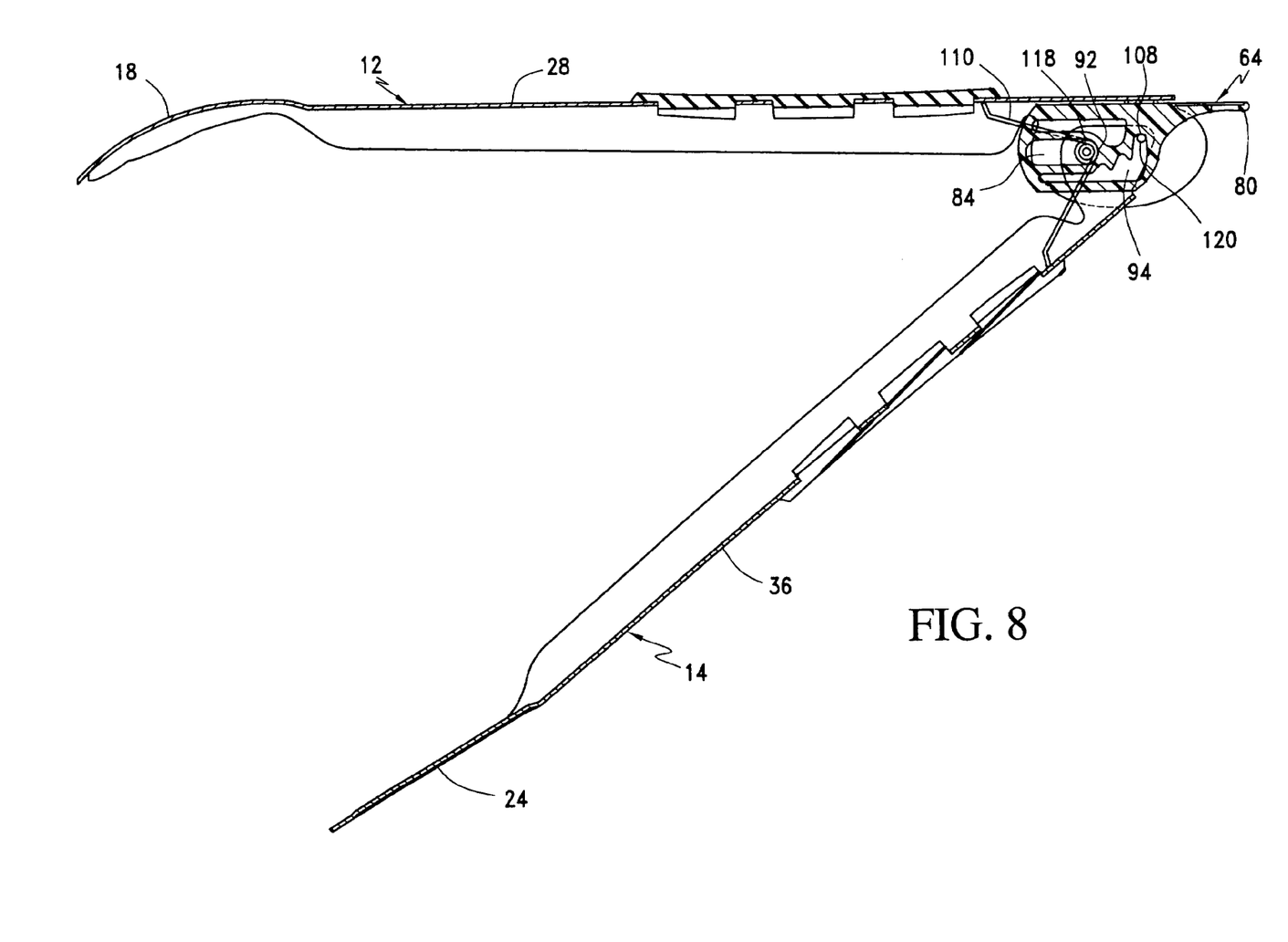

Referring now to FIG. 8, the multi-purpose tongs 10 are illustrated in a fully opened and deployed position. In this position and configuration, the upper tong member 12 and the lower tong member 14 are pivotally opened to their maximum position. Similarly, this position is achieved by squeezing the upper and the lower tong members 12, 14, slightly towards one another to either allow the second pin 120 to be released from pressing against the first surface 102 in the closed position, or the second pin 120 to be released from pressing against the second arcuate surface 104 in the first intermediate opened position, or the second pin 120 to be released from pressing against the third arcuate surface 106 in the second intermediate opened position. The cam means 64 is then slid in the forward direction while the first pin 118 travels within the first pin-receiving transverse slot 84 and the second pin 120 travels within the second pin-receiving transverse slot 94 to the extent that the second pin 120 is in a facing relation with the fourth arcuate surface 108. The upper and the lower tong members 12, 14 are then released to pivotally open about the first pin 118 by the resilient force of the spring 110 to the extent that the second pin 120 will rest against the fourth arcuate surface 108.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. Multi-purpose tongs, comprising:
   a first tong member having a grasping end and a hinge end;
   a second tong member having a grasping end and a hinge end;
   a first pin pivotally connecting said first and said first and said second tong members;
   a cam means for incrementally positioning said first and said second tong members relative to one another,
   wherein said cam means further comprises a cam body comprising a first transverse slot extending laterally through said cam body and a second transverse slot extending laterally through said cam body and separated from said first transverse slot by a transverse wall, said second transverse slot having a plurality of incrementally raised and adjacent support surfaces,
   wherein said cam means is slidably disposed between said first tong member hinge end and said second tong member hinge end, and said first tong member hinge end is pivotally attached to said second tong member hinge end by said first pin, and wherein said first pin extends through said first transverse slot so that said cam means is slidable relative to said first pin, and
   a second pin, wherein said second pin is attached to said second tong member hinge end and extends through said second transverse slot, and wherein said second pin is dimensioned and configured to rest against said plurality of incremental support surfaces as said cam means slidably moves to allow said first and said second tong members to be incrementally positioned relative to one another.

2. The multi-purpose tongs according to claim 1, further comprising a spring having a first end, a second end, and a coiled portion, said spring coiled portion is disposed within said first transverse slot wherein said first pin extends therethrough, and wherein said first and second spring ends are resiliently pressed against inner surfaces of said first and said second tong members.

3. The multi-purpose tongs according to claim 2, wherein said first tong member hinge end further comprises a pair of flanges, and said second tong member hinge end further comprises a pair of flanges, wherein said cam means is slidably disposed between said second tong member pair of flanges and said second tong member pair of flanges is disposed between said first tong member pair of flanges.

4. The multi-purpose tongs according to claim 3, wherein said first tong member pair of flanges each includes an aperture aligned with one another and aligned with said first transverse slot for receiving and securing said first pin.

5. The multi-purpose tongs according to claim 4, wherein said second tong member pair of flanges each includes an aperture aligned with one another and aligned with said second transverse slot for receiving and securing said second pin.

6. The multi-purpose tongs according to claim 5, wherein said cam means further includes a first end and second end defined at opposing ends of said first transverse slot, and wherein said plurality of incremental and adjacent support surfaces includes a first surface, a second arcuate surface incrementally higher than said first surface, a third arcuate surface incrementally higher than said second arcuate surface, and a fourth arcuate surface incrementally higher than said third arcuate surface.

7. The multi-purpose tongs according to claim 6, wherein the multi-purpose tongs are in a closed position when said cam means is in a first position so that said first pin is rested against said first end and said second pin is rested against said first surface.

8. The multi-purpose tongs according to claim 6, wherein the multi-purpose tongs are in first intermediate open position when said cam means is slid outwardly so that said second pin is rested against said second arcuate surface.

9. The multi-purpose tongs according to claim 6, wherein the multi-purpose tongs are in a second intermediate open position when the cam means is slid outwardly so that said second pin is rested against said third arcuate surface.

10. The multi-purpose tongs according to claim 6, wherein the multi-purpose tongs are in a fully opened position wherein said cam means is slid outwardly so that said first pin is rested against said second end and said second pin is rested against said fourth arcuate surface.

11. The multi-purpose tongs according to claim 1, wherein said cam means further comprises an actuating tab integral and adjacent an end thereof for gripping by a user.

12. The multi-purpose tongs according to claim 1, wherein said first and said second tong members each includes an elongated channel portion between the grasping end and the hinge end, the portion having an upper surface and the upper surface including a heat pad disposed thereon.

* * * * *